United States Patent [19]
Pineda

[11] Patent Number: 5,701,263
[45] Date of Patent: Dec. 23, 1997

[54] INVERSE DISCRETE COSINE TRANSFORM PROCESSOR FOR VLSI IMPLEMENTATION

[75] Inventor: Juan Pineda, San Francisco, Calif.

[73] Assignee: Hyundai Electronics America, San Jose, Calif.

[21] Appl. No.: 520,044

[22] Filed: Aug. 28, 1995

[51] Int. Cl.⁶ .................................................. G06F 17/14
[52] U.S. Cl. .................................................. 364/725
[58] Field of Search ........................ 364/725; 358/479, 358/432; 395/800; 382/56

[56] References Cited

U.S. PATENT DOCUMENTS

| | | | |
|---|---|---|---|
| 3,981,443 | 9/1976 | Lynch et al. | 235/156 |
| 4,679,163 | 7/1987 | Arnould et al. | |
| 4,839,844 | 6/1989 | Watari | 364/727 |
| 5,168,375 | 12/1992 | Reisch et al. | 358/432 |
| 5,224,062 | 6/1993 | McMillan, Jr. et al. | |
| 5,249,146 | 9/1993 | Uramoto et al. | 364/725 |
| 5,257,213 | 10/1993 | Kim et al. | |
| 5,285,402 | 2/1994 | Keith . | |
| 5,301,136 | 4/1994 | McMillian, Jr. et al. | 364/725 |
| 5,325,215 | 6/1994 | Shibata et al. | 358/479 |
| 5,345,408 | 9/1994 | Hoogenboom . | |
| 5,379,356 | 1/1995 | Purcell et al. | 362/56 |
| 5,434,808 | 7/1995 | Cohen | 364/725 |
| 5,452,466 | 9/1995 | Fettweis | 395/800 |
| 5,479,364 | 12/1995 | Jones et al. | 364/725 |

FOREIGN PATENT DOCUMENTS 0 212 571  10/1987  European Pat. Off. .
1 530 050  10/1977  United Kingdom .

OTHER PUBLICATIONS

Rao, K.R. and Yip, P., "Discrete Cosine Transforms: Algorithms, Advantages, Applications," Chapter 5, Two-Dimensional DCT Algorithms, pp. 88–121, Academic Press, 1990.

Primary Examiner—Reba I. Elmore
Assistant Examiner—Monica Lewis
Attorney, Agent, or Firm—Townsend and Townsend and Crew LLP

[57] ABSTRACT

A fast and efficient implementation of the inverse discrete cosine transform (IDCT). The disclosed IDCT processor achieves a good balance between efficient VLSI implementation and number of needed arithmetic operations and is thus particularly useful in real-time speech and video decompression applications. A standard IDCT computation is modified by factoring an IDCT formula into two parts: a prescaling of each input value followed by a multiplication with a matrix specially chosen so that the product will represent the IDCT of the input data. The premultiply constants are chosen so that the specially chosen matrix has a limited number of distinct values. The VLSI implementation of the matrix multiplication is thus greatly simplified.

20 Claims, 5 Drawing Sheets

CYCLE AS DEFINED BY
SAMPLE IN MULTIPLY STAGE

| $F_1$ | $F_3$ | $F_5$ | $F_7$ | MULTIPLEXER OUTPUT |
|---|---|---|---|---|
| A | D | C | B | E |
| D | −B | −A | −C | F |
| C | −A | B | D | G |
| B | −C | D | −A | H |

EACH ROW REPRESENTS CROSSBAR INPUTS
TRANSFERRED TO THE DESIGNATED MULTIPLEXER
OUTPUT DURING THE DESIGNATED CYCLE.

*FIG. 6A*

CYCLE AS DEFINED BY
SAMPLE IN MULTIPLY STAGE

| $F_0$ | $F_2$ | $F_4$ | $F_6$ | MULTIPLEXER OUTPUT |
|---|---|---|---|---|
| I | I | I | J | K |
| I | J | −I | −I | L |
| I | −J | −I | I | M |
| I | −I | I | −J | N |

EACH ROW REPRESENTS CROSSBAR INPUTS
TRANSFERRED TO THE DESIGNATED MULTIPLEXER
OUTPUT DURING THE DESIGNATED CYCLE.

*FIG. 6B*

| ADD UNIT | | |
|---|---|---|
| CYCLE | OUTPUT SAMPLE GENERATED | MULTIPLEXER INPUTS SUMMED |
| 1 | $f_0$ | O + S |
| 2 | $f_1$ | P + T |
| 3 | $f_2$ | U + Q |
| 4 | $f_3$ | V + R |

| SUBTRACT UNIT | | |
|---|---|---|
| CYCLE | OUTPUT SAMPLE GENERATED | MULTIPLEXER INPUTS SUBTRACTED |
| 1 | $f_4$ | O − S |
| 2 | $f_5$ | P − T |
| 3 | $f_6$ | U − Q |
| 4 | $f_7$ | V − R |

INVERSE DISCRETE COSINE TRANSFORM PROCESSOR FOR VLSI IMPLEMENTATION

BACKGROUND OF THE INVENTION

The present invention relates generally to processors for obtaining the Inverse Discrete Cosine Transform (IDCT) and more particularly to IDCT processor architectures suitable for VLSI implementation.

New digital video systems such as Set-top Digital Cable TV boxes, Direct Broadcast Satellite (DBS) TV, Terrestrial Digital TV, Digital Video Disk Player (DVD), Interactive TV, Video-On-Demand, and Video Network Servers rely on effective video compression to provide acceptable picture quality while conserving spectrum and/or storage capacity. Wide adoption of the ISO/MPEG-2 Main Profile at Main Level (MP@ML) video compression standard has been envisioned. This standard makes use of the 2-dimensional Discrete Cosine Transform as a step in compression. In accordance with this standard, the 2-d Discrete Cosine Transform (DCT) is applied by an encoder to each 8×8 pixel block or differential pixel-error block in a picture or predictive-error picture frame. At the receive-end, the 8×8 pixel or pixel-error block can be reconstructed by performing the 2-d IDCT on the spatial frequency coefficient block.

The input digital video frame of the MPEG-2 Encoder (MP@ML) consists of a Luminarice frame and two color difference frames. Each luminance frame includes 720 pixels×480 lines. Each color difference frame includes 720 pixels×240 lines for Chrominance component frames. These frames are segmented into Macroblocks that consist of six 8×8 pixel-blocks (the first four pixel-blocks are from Luminance and the next two from color difference frames). The subsequent coding strategy generates Intra (original), Prediction (frame-difference) or both types of Macroblocks. These 8×8 pixel or prediction-error block then undergo the 2-d DCT processing that converts the statistically dependent pixels or pixel-errors of these blocks into somewhat independent spatial frequency coefficients. These coefficients are generally located in the upper left corner of the 8×8 transform matrix, as most of the spatial energy is concentrated in a few low-frequency coefficients. The video compression process utilizes the fact that the human viewer is more critical of errors in the low frequency regions than in the high frequency or detailed ones. Thus the coefficient selection, quantization and statistical coding, e.g. Huffman coding, of these DCT coefficients result in significant data compression for a Digital Television Broadcast System.

In an MPEG decoder suitable for use within a digital video display system, numerous IDCT operations must be performed in real-time. For example, if MPEG-2 (MP@ML) image frames are to be displayed at 30 frames/sec, up to 243,000 8×8 IDCT operations must be performed per second.

To perform these operations, an MPEG decoder necessarily incorporates a dedicated IDCT processor. Not only must this processor operate quickly and accurately, optimally it should have a simple VLSI implementation, suitable for consumer applications.

SUMMARY OF THE INVENTION

The invention provides a fast and efficient implementation of the inverse discrete cosine transform (IDCT). An IDCT processor of the present invention achieves a good balance between efficient VLSI implementation and number of needed arithmetic operations and is thus particularly useful in real-time speech and video decompression applications.

In one embodiment, calculations for the IDCT are performed on two samples every clock period.

In accordance with the invention, a standard IDCT computation is modified by factoring an IDCT formula into two parts: a prescaling of each input value followed by a multiplication by a matrix specially chosen so that the product will represent the IDCT of the input data. The premultiply constants are chosen so that the specially chosen matrix has a limited number of distinct values. The VLSI implementation of the matrix multiplication is thus greatly simplified.

In accordance with one aspect of the invention, an IDCT processor is provided that is optimized for use within an MPEG-2 decoder. The IDCT processor operates on 8×8 blocks of MPEG data. This IDCT processor implements a fast two-dimensional 8-point IDCT computation procedure. An input matrix of two-dimensional DCT coefficients is first prescaled. The resulting prescaled matrix is then applied to a matrix multiplier that multiplies by a special two-dimensional IDCT coefficient matrix on a row-by-row basis to accumulate an intermediate output matrix. This intermediate output matrix is fed to a transposition memory which forms a transposed version of the output matrix. The matrix multiplier then multiplies the transposed output matrix by the special two-dimensional output matrix on a row-by-row basis to accumulate a result matrix. The special two-dimensional coefficient matrix and prescaling coefficients are selected so that the result matrix approximates the IDCT of the input DCT coefficients and so that the two-dimensional coefficient matrix includes only five unique values, one of which is unity.

In the context of an MPEG decoder, the prescaling operation can be performed in conjunction with the computations needed for dequantization without requiring extra processing cycles or VLSI area. Since the two-dimensional coefficient matrix is limited to four distinct values, the construction of the matrix multiplier is greatly simplified. For example, the matrix multiplier may be implemented with a data path that contains four constant value multipliers, one for each of the unique non-unity values in the matrix. Using four multipliers in this way results in a throughput of two samples per clock tick. This implementation is particularly efficient because the number of multipliers needed is equal to the number of unique non-unity coefficient values. Each multiplier need only multiply by a single constant, greatly optimizing the multiplier logic.

Furthermore, the data paths needed for this matrix multiplier can be efficiently implemented in VLSI because they are very regular. This regularity can be exploited by custom layout techniques to yield very small dense VLSI layouts, resulting in an IDCT processor that consumes only 20–30% of the overall MPEG decoder area. With appropriate modifications, this architecture could be extended within the scope of the present invention to operate on any size DCT coefficient matrix.

The invention will be better understood upon reference to the accompanying drawings and detailed description.

DESCRIPTION OF THE PREFERRED EMBODIMENT

An IDCT processor according to one embodiment of the present invention performs the IDCT calculation on input DCT coefficient data in two stages. In the first stage, input DCT coefficients are multiplied by a prescaling factor which varies in accordance with the position of the coefficient within the data. For example, for one-dimensional IDCT coefficient data, the data would typically be input as a series of vectors and the prescaling factor could vary periodically with position within a given vector. For two-dimensional IDCT coefficient data, the data would typically be input as a series of matrices and the prescaling factor could vary periodically with both row and column position within the matrix.

The second stage involves multiplication by a special IDCT coefficient matrix. For one-dimensional IDCT coefficient data, the multiplication is performed once and the result is an approximation of the IDCT of the input to the prescaler. For two-dimensional IDCT coefficient data, the multiplication is preferably performed a first time on a prescaled input matrix one row at a time to develop an intermediate output matrix. The multiplication is then performed again on the intermediate output matrix to develop a result matrix that approximates the IDCT of the input.

In accordance with the invention, the prescaling factors and IDCT coefficient matrix are specially chosen to simplify the multiplication hardware while assuring an accurate result. The two-stage IDCT computation procedure and apparatus will be made clearer with reference to a specific example, computation of the 2-dimensional IDCT of 8×8 DCT coefficient data as would be required in the context of MPEG-2 decoding.

The 2-d inverse DCT is typically defined as:

$$f_{x,y} = \frac{2}{8} \sum_{u=0}^{7} C_u \cos\frac{\pi(2x+1)u}{16} \sum_{v=0}^{7} C_v \cos\frac{\pi(2y+1)v}{16} F_{u,v} \quad (1)$$

where:

$$C_u, C_v = \begin{cases} \frac{1}{\sqrt{2}} & \text{for } u,v = 0 \\ 1 & \text{otherwise} \end{cases} \quad (2)$$

In accordance with one embodiment of the present invention, the transform coefficients may be factored as follows:

$$C_u \cos\frac{\pi(2x+1)u}{16} = P_u T_{x,u} \quad (3)$$

where, $$P_u = \begin{cases} \cos\frac{\pi}{4} & \text{for } u = 0,4 \\ \cos\frac{\pi}{8} & \text{for } u = 2,6 \\ \cos\frac{\pi}{16} & \text{for } u = 1,3,5,7 \end{cases} \quad (4)$$

and, $$T_{x,u} = \frac{C_u \cos\frac{\pi(2x+1)u}{16}}{P_u} \quad (5)$$

The result is that the transform matrix, $T_{xu}$ takes on the values given in the following Table 1:

| $T_{XU}$ | | | | u | | | | |
|---|---|---|---|---|---|---|---|---|
| x | 0 | 1 | 2 | 3 | 4 | 5 | 6 | 7 |
| 0 | 1.00 | 1.00 | 1.00 | .85 | 1.00 | .57 | .41 | .20 |
| 1 | 1.00 | .85 | .41 | −.20 | −1.00 | −1.00 | −1.00 | −.57 |
| 2 | 1.00 | .57 | −.41 | −1.00 | −1.00 | .20 | 1.00 | .85 |
| 3 | 1.00 | .20 | −1.00 | −.57 | 1.00 | .85 | −.41 | −1.00 |
| 4 | 1.00 | −.20 | −1.00 | .57 | 1.00 | −.85 | −.41 | 1.00 |
| 5 | 1.00 | −.57 | −.41 | 1.00 | −1.00 | −.20 | 1.00 | −.85 |
| 6 | 1.00 | −.85 | .41 | .20 | −1.00 | 1.00 | −1.00 | .57 |
| 7 | 1.00 | −1.00 | 1.00 | −.85 | 1.00 | −.57 | .41 | −.20 |

The factors vector, $P_u$, contains four values as shown in the following Table 2.11

| Pu | 0 | 1 | 2 | 3 | 4 | 5 | 6 | 7 |
|---|---|---|---|---|---|---|---|---|
| | .71 | .98 | .92 | .98 | .71 | .98 | .92 | .98 |

It should be noted that the numbers shown in these tables have been rounded for simplicity of explanation. For any real implementation, the numbers should be recomputed based on the formulas presented.

The coefficients of $T_{xu}$ now have only 5 distinct values: 1, 0.85, 0.57, 0.41 and 0.20. Furthermore, it is apparent from inspection that only 14 multiplies need be computed per row because the others are either trivial, or duplicates, enabling efficient VLSI implementation. For the column corresponding to u=0, no multiplications are required, since all the values are unity. For the column corresponding to u=1, there are six non-unity values. However the column is antisymmetric with only a sign change distinguishing the value for x=1 from the value for x=6, the value for x=2 from the value for x=5, and so on. Therefore, only three multiplies are needed for the non-unity values, since the sign change can be folded into a summation step. Inspection of all the columns reveals that 3 multiplies are required for column u=1, 1 multiply is needed for column u=2, column u=3, 3 multiplies are required for column u=5, 1 multiply u=6, and 3 multiplies for column u=7, adding up to a total of 14 multiplies to multiply by the entire matrix.

This form of the matrix lends itself readily to VLSI implementation. Plugging in $T_{xu}$ and $P_u$ into the original equation (1), the 2-d IDCT transform can be rewritten as:

$$f_{x,y} = \frac{1}{4} \sum_{u=0}^{7} T_{x,u} \sum_{v=0}^{7} T_{y,v} F'_{u,v} \quad (6)$$

where $$F'_{u,v} = P_u P_v F_{u,v}, \text{ and} \quad (7)$$

In accordance with the present invention, the factors $P_u$ and $P_v$ may be separated from the transform and implemented as a prescaling of the input samples. In the context of an MPEG decoder, this prescaling can be performed in conjunction with dequantization.

Computation of the transform may be further simplified in accordance with the invention by taking advantage of the symmetry in $T_{xu}$. For even values of u, $T_{xu}$ is symmetric in x (Table 3), while for odd values it is anti-symmetric in x (Table 4).

TABLE 3

| $T_{XU}$ | u | | | |
|---|---|---|---|---|
| x | 0 | 2 | 4 | 6 |
| 0 | 1.00 | 1.00 | 1.00 | .41 |
| 1 | 1.00 | .41 | −1.00 | −1.00 |
| 2 | 1.00 | −.41 | −1.00 | 1.00 |
| 3 | 1.00 | −1.00 | 1.00 | −.41 |
| 4 | 1.00 | −1.00 | 1.00 | −.41 |
| 5 | 1.00 | −.41 | −1.00 | 1.00 |
| 6 | 1.00 | .41 | −1.00 | −1.00 |
| 7 | 1.00 | 1.00 | 1.00 | .41 |

TABLE 4

| $T_{XU}$ | u | | | |
|---|---|---|---|---|
| x | 1 | 3 | 5 | 7 |
| 0 | 1.00 | .85 | .57 | .20 |
| 1 | .85 | −.20 | −1.00 | −.57 |
| 2 | .57 | −1.00 | .20 | .85 |
| 3 | .20 | −.57 | .85 | −1.00 |
| 4 | −.20 | .57 | −.85 | 1.00 |
| 5 | −.57 | 1.00 | −.20 | −.85 |
| 6 | −.85 | .20 | 1.00 | .57 |
| 7 | −1.00 | −.85 | −.57 | −.20 |

This symmetry may be exploited by computing the bottom half of the matrix multiply using intermediate results from the top half. The matrix sums for x=0, 1, 2 and 3 are preferably calculated separately for even and odd u values. The even and odd sums are then combined together with the appropriate sign and reflection in x to get the matrix sums for all x. Considering only a single dimension, and ignoring the multiply by ¼, the matrix multiply becomes:

$$f_x = \begin{cases} \sum_{u=0,2,4,6} T_{x,u}F_u + \sum_{u=1,3,5,7} T_{x,u}F_u & \text{for } x=0,1,2,3 \quad (8) \\ \sum_{u=0,2,4,6} T_{7-x,u}F_u - \sum_{u=1,3,5,7} T_{7-x,u}F_u & \text{for } x=4,5,6,7 \quad (9) \end{cases}$$

and

This computation requires 14 multiplies and 40 adds for every 8 output samples and incorporates regularity that facilitates efficient VLSI implementation. In addition, since the number of cascaded multiplies for a 2-d transform is limited to 2, relatively little precision is required in the computations. Those of skill in the art will appreciate that this factorization can be readily adapted to two-dimensional transforms having dimension other than 8×8 or to one-dimensional transforms.

Figure 1:
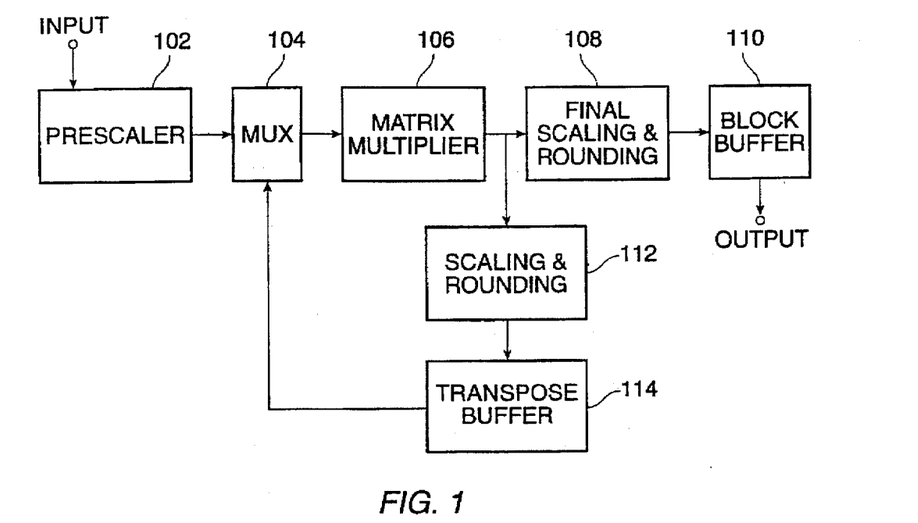
FIG. 1 depicts a 2-d IDCT processor in accordance with one embodiment of the present invention.

FIG. 1 depicts a 2-d IDCT processor 100 in accordance with one embodiment of the present invention. IDCT processor 100 includes a prescaler 102, a multiplexer 104, a matrix multiplier 106, a final scaling/rounding stage 108, a block buffer 110, an intermediate scaling/rounding stage 112, and a transpose buffer 114. Generally speaking, prescaler 102 performs the prescaling operation of equation (7) while matrix multiplier 106 performs the matrix multiplication of equations (8) and (9).

Figure 2:
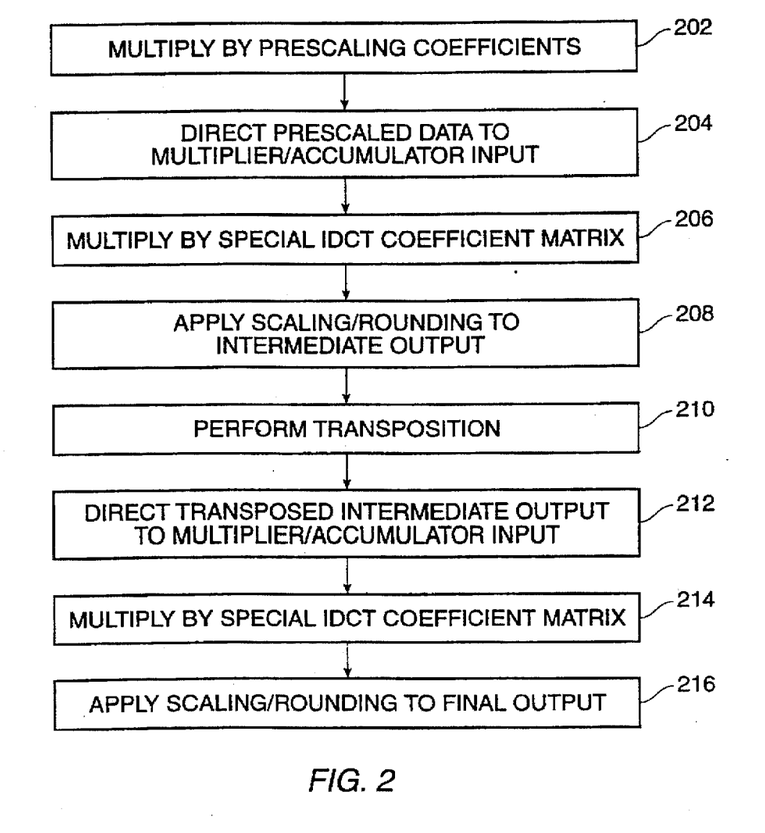
FIG. 2 is a flowchart describing the steps of efficiently obtaining the 2-d IDCT in accordance with one embodiment of the present invention.

FIG. 2 is a flowchart describing the steps of efficiently obtaining the 2-d IDCT in accordance with one embodiment of the present invention. The flowchart is herein described with reference to an 8×8 input matrix of DCT coefficients but other dimensions would be readily achievable in accordance with the invention. At step 202, prescaler 102 multiplies each DCT coefficient in the input matrix by the prescaling coefficient from equation (7) that corresponds to its position in the matrix. Referring again to FIG. 1, the properly scaled and rounded prescaled DCT coefficients are one input to multiplexer 104. The remainder of the computation follows a two-pass method, wherein matrix multiplier 106 is essentially applied to the prescaled DCT coefficient data twice. First, at step 204, multiplexer 104 directs the prescaled DCT coefficient data to an input of matrix multiplier 106. At step 206, multiplier/accumulator 106 individually multiplies each row of the prescaled DCT coefficient matrix by the IDCT coefficient matrix of Table 1 to form an intermediate output matrix. The internal operation of matrix multiplier 106 will be made clearer with reference to FIGS. 4–5 and 6A–6C. At step 208, intermediate scaling/rounding stage 112 assigns the proper bit accuracy to this intermediate output matrix. At step 210, the scaled and rounded intermediate output matrix is transposed by transpose buffer 114.

For the second pass of the calculation, multiplexer 104 selects the transposed intermediate output matrix from transposition buffer 114 to be the input to matrix multiplier 106 at step 212. Matrix multiplier 106 then multiplies the transposed intermediate output matrix by the IDCT coefficient matrix of Table 1 at step 214, again on a row-by-row basis to form an output matrix which approximates the IDCT of the original input DCT coefficient data. At step 216, this output matrix is assigned an appropriate bit accuracy by final scaling/rounding stage 108. The final output data is accumulated in block buffer 110, where it is available for subsequent MPEG-2 decoding.

Figure 3:
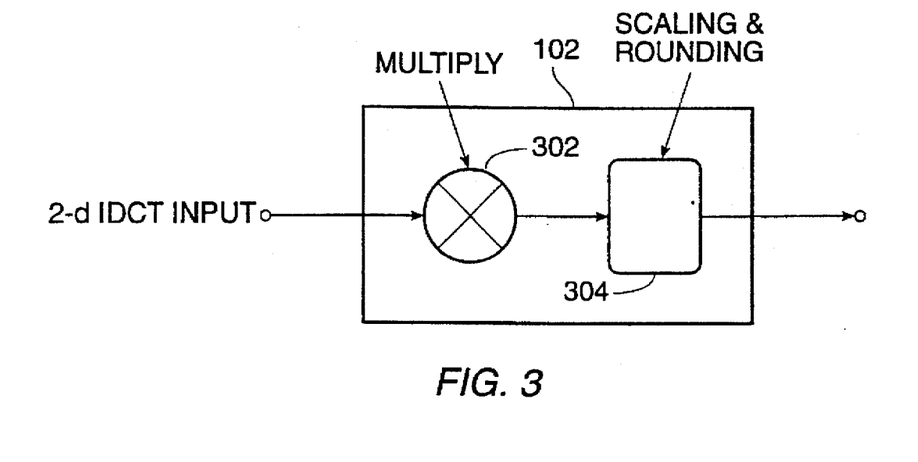
FIG. 3 depicts one embodiment of a prescaler within a 2-d IDCT processor in accordance with one embodiment of the present invention.

FIG. 3 depicts one embodiment of prescaler 102 in accordance with the present invention. Prescaler 102 includes a multiplication stage 302 and an internal scaling/rounding stage 304. Multiplication stage 302 accepts an 8×8 DCT coefficient matrix as an input, 15 bits at a time. Each coefficient is multiplied by the prescaling coefficient from equation (7) that corresponds to its position in the matrix. Scaling/rounding stage 304 then scales and rounds the multiplication stage output to assign the proper bit accuracy.

It will be appreciated from the foregoing that a one-dimensional IDCT could be computed within the scope of the present invention using a similar system but without the need to apply matrix multiplier 106 twice. Thus, multiplexer 104, transpose buffer 114, and intermediate scaling/rounding stage 112 would be unnecessary in a 1-dimensional implementation. Such an implementation would find application in decompression of digitally encoded speech, for example.

Figure 4:
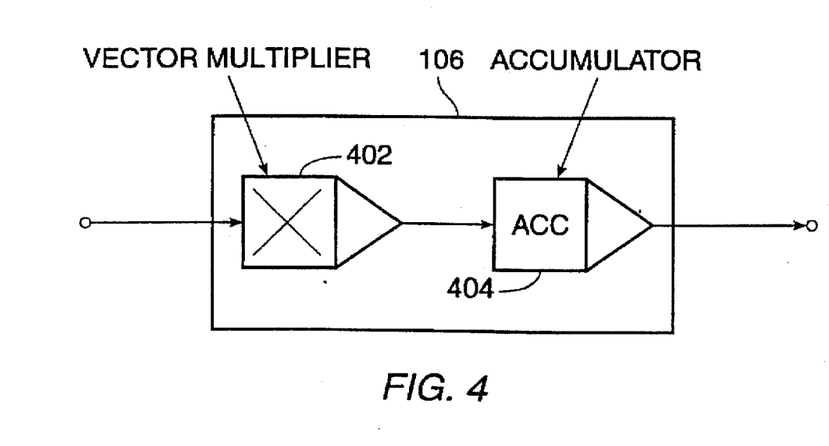
FIG. 4 depicts a simplified representation of a matrix multiplier within a 2-d IDCT processor in accordance with one embodiment of the present invention.

FIG. 4 depicts a simplified representation of matrix multiplier 106 in accordance with one embodiment of the present invention. Matrix multiplier 106 includes a vector multiplier 402 and an accumulator 404. The input data to matrix multiplier 106 preferably has a maximum width of 18 bits. Vector multiplier 402 computes the product of each of the eight samples of a row of input data with each of the possible IDCT coefficient values from Table 1. Accumulator 404 then sums these products appropriately to form the product of the row of input data with the IDCT matrix of Table 1. The details of the operation of matrix multiplier 106 will be further clarified with reference to FIG. 5 and FIGS. 6A–6C.

Figure 5:
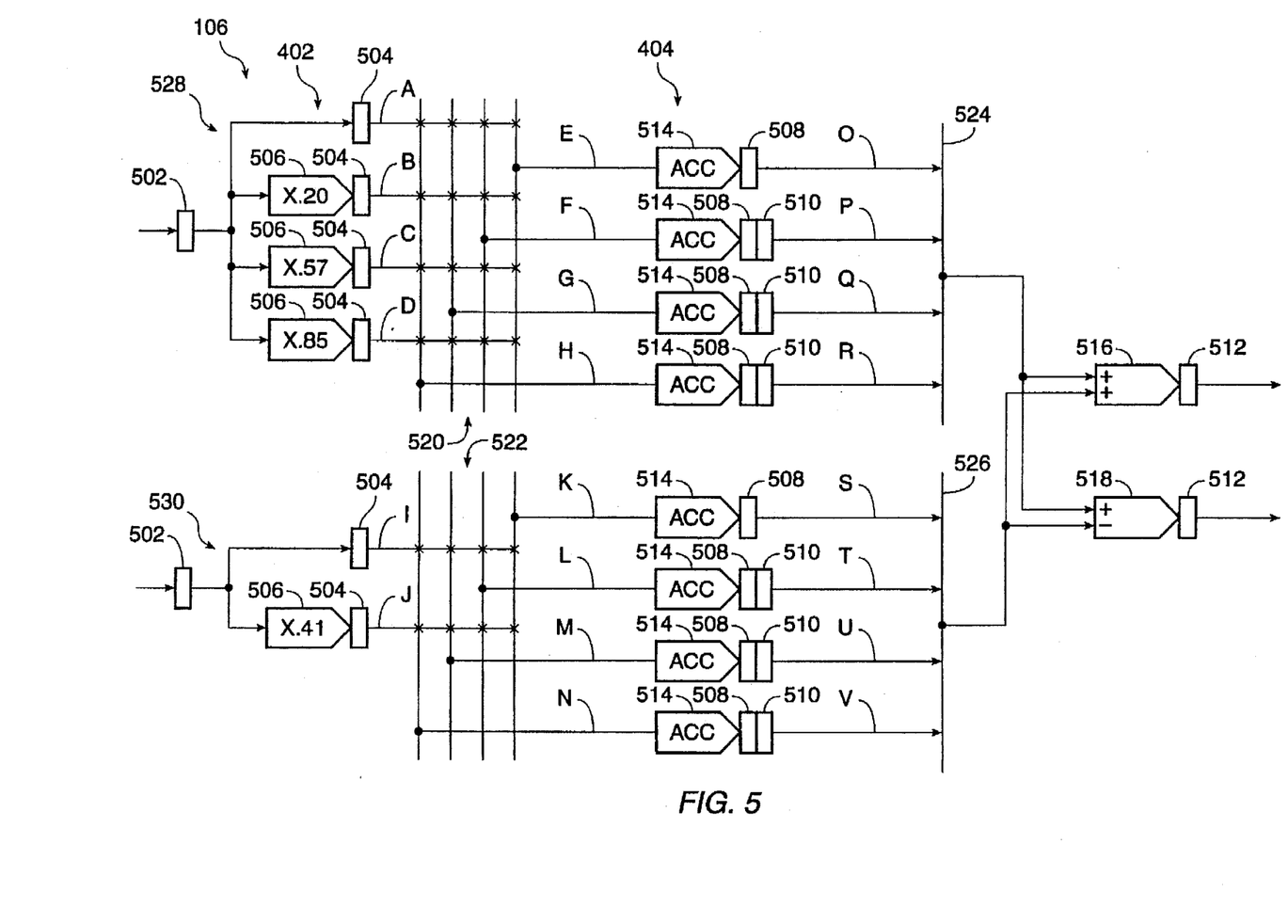
FIG. 5 depicts a detailed representation of the matrix multiplier of FIG. 4 in accordance with one embodiment of the present invention.

FIG. 5 depicts a detailed representation of matrix multiplier 106 in accordance with one embodiment of the present invention. Vector multiplier 402 and accumulator 404 are shown divided into their computational constituents. Vector multiplier 402 includes a plurality of registers 502 and 504 and fixed-point multipliers 506. Accumulator 404 includes a plurality of registers 508, 510, and 512, accumulator units 514, an add unit 516, and a subtract unit 518. Crossbar switches 520 and 522 interface between vector multiplier 402 and accumulator 404. Multiplexers 524 and 526 interface between the accumulator units 514 and add unit 516 and subtract unit 518.

In accordance with equations (8) and (9), the odd values $F_{1,3,5,7}$ and even values $F_{0,2,4,6}$ of a given input row enter the data path in pairs each clock cycle. In order to take advantage of the inherent symmetry properties of the special IDCT coefficient matrix, the data path is divided into an odd channel 528 and an even channel 530. Fixed-point multipliers 506 implement the multiplication of the input samples by the non-unity coefficients of the IDCT coefficient matrix of Table 1 to generate a series of products that are the input to crossbar switches 520 and 522. Crossbar switch 520 is preferably a 4:4 crossbar switch having inputs A–D and outputs E–H and essentially comprises four 4:1 multiplexers. Crossbar switch 522 is preferably a 2:4 crossbar switch having inputs I–J and outputs K–N and essentially comprises four 2:1 multiplexers. Crossbar switches 520 and 522 have the ability to map any input to any output.

Figure 6A:
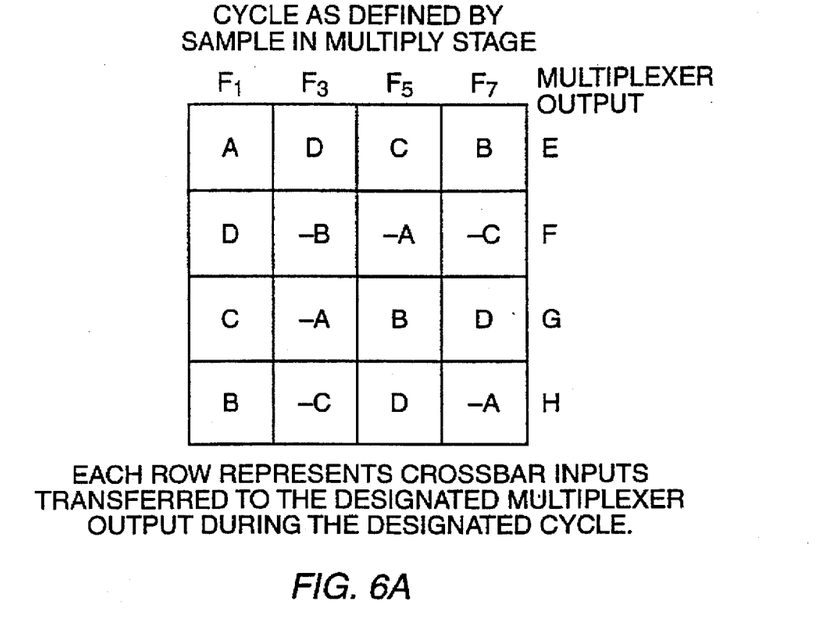
FIGS. 6A-6C depicts the operation of crossbar switches and multiplexers within the matrix multiplier of FIGS. 4-5 in accordance with one embodiment of the present invention.
Figure 6B:
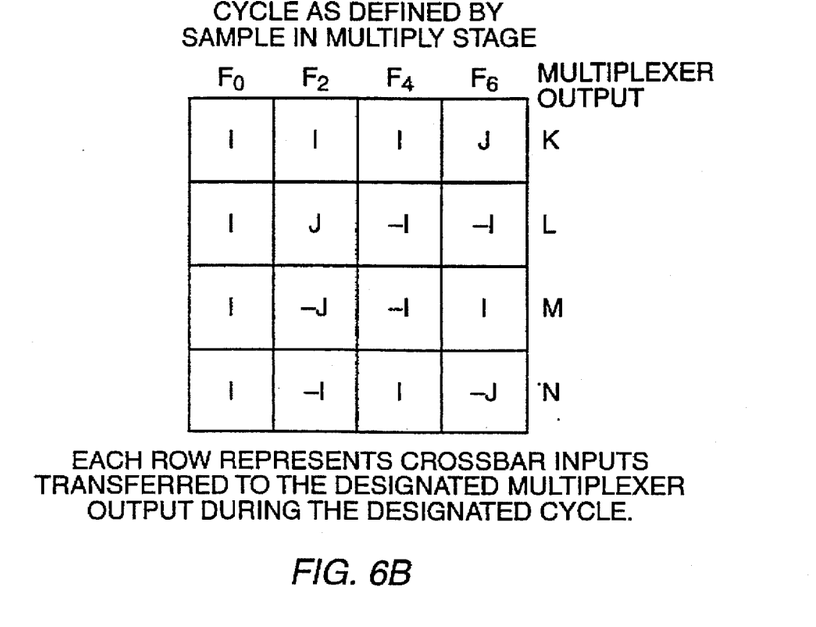

The operation of crossbar switches 520 and 522 to implement the row-by-row multiplication by the IDCT coefficient matrix of Table 1 will be explained with reference to FIGS. 6A–6B. FIG. 6A depicts the operation of crossbar switch 520 in accordance with one embodiment of the present invention. The columns represent clock periods labeled by the input sample processed by multipliers 506 during that clock period. Each row is labeled with the reference designator of a particular crossbar switch output. Each table entry at a particular row and column location is the reference designator for the crossbar switch input that is directed to the output denoted by the row heading during the time period denoted by the column heading. The signs listed with the table entries denote necessary sign changes implemented within crossbar switch 520. FIG. 6B similarly describes the operation of crossbar switch 522. It is clear from FIGS. 6A–6B that the accumulator units combine the outputs of vector multiplier 402 to form two sets of four sums-of-products which are transferred to add unit 516 and subtract unit 518 as intermediate results in the matrix multiplication.

Figure 6C:
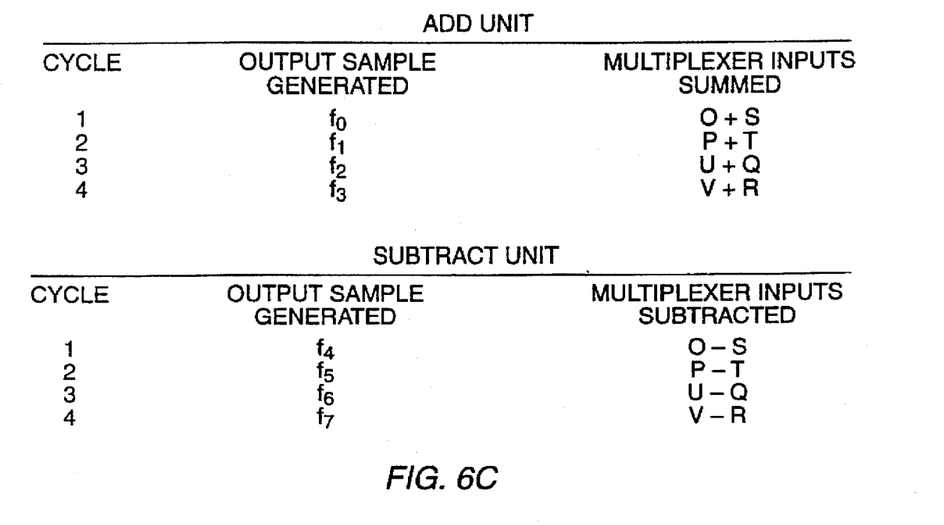

FIG. 6C depicts the operation of multiplexers 524 and 526 in accordance with one embodiment of the present invention. Multiplexers 524 and 526 have inputs O–R and S–V, respectively. Add unit 516 generates the first four values of an output row. Subtract unit 518 generates the last four values. Each of add unit 516 and subtract unit 518 generates a different one of its values during each of four cycles by adding two sums of products identified in FIG. 6C. The accumulator outputs as contained in registers 506 are only valid during one of the four cycles, because the accumulators store intermediate sums in the three earlier cycles. Registers 510 sustain the accumulator outputs for three additional cycles. The accumulators connected to crossbar switch outputs E and K do not require these additional registers since these accumulator outputs are used during the clock period in which they are valid.

Those of skill in the art will appreciate that FIGS. 5 and 6A–6C define a system that implements multiplication of a single row vector by the matrix of Table 1. Add unit 516 and subtract unit 518 operate in parallel and produce eight output values every four clock periods, or two samples per clock period. The special properties of the matrix of Table 1 permit the computation to be implemented with only 24 registers, 4 fixed-point multipliers, 10 carry look ahead adders (including the accumulator units, add unit S16, and subtract unit S18) and 32 multiplexer inputs (among crossbar switches 520 and 522 and multiplexers 524 and 526). In the preferred embodiment, each of these computational elements is separately implemented without the use of cycle sharing.

Matrix multiplier 106 has an overall latency of six cycles. Vector multiplier 402 requires one cycle. Accumulator units 506 require four cycles to generate a valid output. Add unit 508 and subtract unit 510 then require an additional cycle, thus providing the total of six cycles.

Since the overall IDCT computation requires two passes through matrix multiplier 106, the above-described IDCT processor produces a single output sample every clock period. Performing the IDCT of a single 8×8 block of MPEG-2 data thus requires 64 clock periods. In the preferred embodiment, the clock rate is 50 MHz and an 8×8 block is processed within 1.28 microseconds.

Preferably, the present invention is applied within the context of a MPEG-2 Video with Main Profile at Main Level (MP@ML) decoder incorporating two-channel MPEG-2 Audio and MPEG-2 Systems Demultiplexing in a single chip implemented in a 0.5 micron technology. The IDCT processor of the preferred embodiment requires only 20–30% of the surface area of the chip. The IDCT processor of the present invention may be applied to advantage, e.g., in MPEG decoders as implemented within settop digital cable TV converters, Direct Broadcast Satellite (DBS) receivers, terrestrial digital television receivers, Digital Video Disk (DVD) players, interactive TV, video-on-demand, and video network servers as existing and envisioned.

Figure 7:
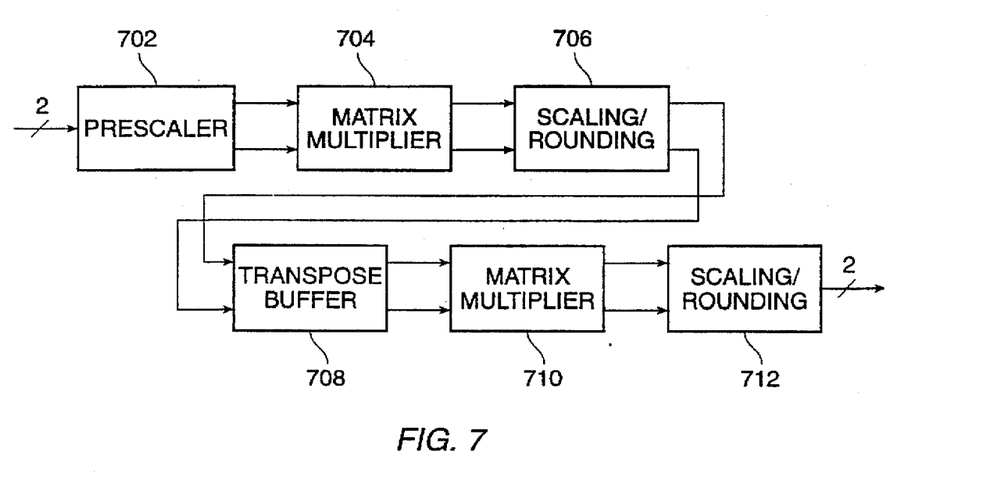
FIG. 7 depicts a 2-d IDCT processor in accordance with an alternative embodiment of the present invention.

FIG. 7 depicts a 2-d IDCT processor 700 in accordance with an alternative embodiment of the present invention. This embodiment is particularly useful in speed-sensitive applications such as decoding MPEG in the context of HDTV reception. IDCT processor 700 includes a prescaler 702, a first matrix multiplier 704, a first scaling/rounding stage 706, a transpose buffer 708, a second matrix multiplier 710, and a second scaling/rounding stage 712.

IDCT processor 700 is similar to IDCT processor 100 depicted in FIG. 1 but implements each pass of matrix multiplication with a different matrix multiplier. Prescaler 702 may have a structure similar to prescaler 102. First matrix multiplier 704 and second matrix multiplier 710 may have a structure similar to matrix multiplier 106. First scaling/rounding stage may be similar to scaling/rounding stage 112. Transpose buffer 708 may be similar to transpose buffer 114. Second scaling/rounding stage 712 may be similar to final scaling/rounding stage 712.

Matrix multipliers 704 and 710 essentially operate in a pipelined fashion. Accordingly, two samples may be processed every clock period as opposed to only one in the configuration of FIG. 1. The tradeoff is the increased area associated with duplicating the matrix multiplier.

While the above is a complete description of the preferred embodiments of the invention, various alternatives, modifications and equivalents may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. An inverse discrete cosine transform (IDCT) processor comprising:
   a pre-scaler that receives a series of DCT coefficients and multiplies each said coefficient in said series by a prescaling factor that varies in accordance with a predetermined function of coefficient position within said series and that provides a series of prescaled DCT coefficients as an output signal; and
   a matrix multiplier operative to receive said series of prescaled DCT coefficients as an input and that provides as a final output signal a series of values representing a product of said series of prescaled DCT coefficients and a predetermined IDCT coefficient matrix of size NXN, wherein said predetermined IDCT coefficient matrix is selected to match said predetermined function so that said final output signal represents an inverse discrete cosine transform of said series of DCT coefficients and wherein the elements of said predetermined IDCT coefficient matrix have no more than N/2 distinct non-unity magnitudes.

2. The IDCT processor of claim 1, wherein N=8.

3. The IDCT processor of claim 2, wherein said predetermined IDCT coefficient matrix is approximately equal to said prescaling factor is $\cos(\pi/4)$ for u=0 or 4, $\cos(\pi/8)$ for u=2 or 6, and $\cos(\pi/16)$ for u=1, 3, 5, or 7, u representing a position within said series of DCT coefficients.

4. The IDCT processor of claim 2, wherein said matrix multiplier comprises exactly four multipliers and each of said four multipliers is a constant value multiplier.

5. The IDCT processor of claim 4, wherein said matrix multiplier produces two values of the final output signal per clock period.

6. The IDCT processor of claim 5, wherein said multiplier has an overall latency of six cycles.

7. In a processing system, a method for obtaining an Inverse Discrete Cosine Transform of an input signal, said input signal representing a series of DCT coefficients, said method comprising the steps of:
   receiving the input signal;
   multiplying each DCT coefficient in said series by a selected prescaling factor that varies with position within said series of said DCT coefficient in accordance with a predetermined prescaling function, to form a prescaled signal representing a series of prescaled DCT coefficients; and
   multiplying said series of prescaled DCT coefficients by a predetermined IDCT coefficient matrix of size NXN to form an output signal, representing an output series of values, wherein said predetermined IDCT coefficient matrix is selected to match said predetermined prescaling function so that said output series approximates an IDCT of said series of DCT coefficients and wherein the elements of said predetermined IDCT coefficient matrix have no more than N/2 distinct non-unity magnitudes.

8. The method of claim 7, wherein N=8.

9. The method of claim 8, wherein said predetermined IDCT coefficient matrix is approximately equal to said prescaling factor is $\cos(\pi/4)$ for u=0 or 4, $\cos(\pi/8)$ for u=2 or 6, and $\cos(\pi/16)$ for u=1, 3, 5, or 7, u representing a position within said series of DCT coefficients.

10. In a two-dimensional inverse discrete cosine transform (IDCT) processor, a method for approximating a two-dimensional inverse discrete cosine transform of an NXN matrix of DCT coefficients comprising the steps of:
    receiving an input signal representing said matrix of DCT coefficients;
    generating a prescaled input signal representing an NXN matrix of prescaled DCT coefficients by using a prescaler to multiply each said coefficient in said matrix of DCT coefficients by a first prescaling factor that varies with column position within said matrix of DCT coefficients and by a second prescaling factor that varies with row position within said matrix of DCT coefficients;
    generating an intermediate output signal representing an NXN intermediate output matrix from said prescaled input signal by multiplying said matrix of prescaled DCT coefficients by a predetermined IDCT coefficient matrix of size NXN;
    transforming said intermediate output signal into an intermediate input signal representing an NXN intermediate input matrix by transposing said intermediate output matrix to obtain said intermediate input matrix; and
    generating a final output signal representing an NXN final output matrix by multiplying said intermediate input matrix by said predetermined IDCT coefficient matrix, wherein,
    said predetermined IDCT coefficient matrix is selected to match said first and second prescaling factors so that said final output matrix approximates an IDCT of said matrix of DCT coefficients; and
    the elements of said predetermined IDCT coefficient matrix have no more than N/2 distinct non-unity magnitudes.

11. The method of claim 10, wherein N=8.

12. The method of claim 11 wherein said predetermined IDCT coefficient matrix is approximately equal to said first prescaling fact is $\cos(\pi/4)$ for u=0 or 4, $\cos(\pi/8)$ for u=2 or 6, and $\cos(\pi/16)$ for u=1, 3, 5, or 7, and said second prescaling factor is $\cos(\pi/4)$ for v=0 or 4, $\cos(\pi/8)$ for v=2 or 6, and $\cos(\pi/16)$ for v=1, 3, 5, or 7, u representing a row position within said matrix and v representing a column position within said matrix of DCT coefficients.

13. A two-dimensional inverse discrete cosine transform (IDCT) processor comprising:
    a pre-scaler that receives an input signal representing a matrix of DCT coefficients and multiplies each said DCT coefficient in said matrix by a first prescaling factor that varies with column position within said matrix and by a second prescaling factor that varies with row position within said matrix and that provides an output signal representing a matrix of prescaled DCT coefficients;
    a first matrix multiplier that receives said output signal of said prescaler and multiplies said matrix of prescaled DCT coefficients by a predetermined IDCT coefficient matrix of size NXN to develop an output signal representing an intermediate output matrix;
    a transpose buffer that receives said output signal of said first matrix multiplier and transposes said intermediate output matrix to develop an output signal representing an intermediate input matrix; and
    a second matrix multiplier that receives said output signal of said transpose buffer and multiplies said intermediate input matrix by said predetermined IDCT coefficient matrix to develop a final output signal representing a final output matrix,
    wherein,
    said predetermined IDCT coefficient matrix is selected to match said first and second prescaling factors so that said final output matrix approximates an IDCT of said input matrix; and the elements of said predetermined IDCT coefficient matrix have no more than N/2 distinct non-unity magnitudes.

and wherein said predetermined IDCT coefficient matrix has exactly N/2 non-unity values.

14. The IDCT processor of claim 13, wherein said first and second matrix multipliers are distinct multipliers.

15. The IDCT processor of claim 13, wherein said first and second matrix multipliers are the same multiplier.

16. The IDCT processor of claim 13 wherein N=8.

17. The IDCT processor of claim 16 wherein said predetermined IDCT coefficient matrix is approximately equal to said first prescaling factor is cos ($\pi/4$) for u=0 or 4, cos ($\pi/8$) for u=2 or 6, and cos ($\pi/16$) for u=1, 3, 5, or 7, and said second prescaling factor is cos ($\pi/4$) for v=0 or 4, cos ($\pi/8$) for v=2 or 6, and cos ($\pi/16$) for v=1, 3, 5, or 7, u representing a row position within and v representing a column position within said matrix of DCT coefficients.

18. The IDCT processor of claim 16 wherein each of said first and second matrix multipliers comprises exactly four multipliers and each of said four multipliers is a constant value multiplier.

19. The IDCT processor of claim 18 wherein each of said first and second matrix multipliers produces two values of the final output matrix per clock period.

20. The IDCT processor of claim 19, wherein each of said first and second multipliers has an overall latency of six cycles.

* * * * *